US005360224A

United States Patent [19]

Geiger et al.

[11] Patent Number: 5,360,224

[45] Date of Patent: Nov. 1, 1994

[54] WHEELCHAIR FRAME ASSEMBLY AND COMPONENTS FOR USE THEREON

[75] Inventors: Richard Geiger, Alameda; A. Scott Robertson; Neville Page, both of San Francisco, all of Calif.

[73] Assignee: Medical Composite Technology, Inc., Watsonville, Calif.

[21] Appl. No.: 978,941

[22] Filed: Nov. 18, 1992

Related U.S. Application Data

[63] Continuation-in-part of Ser. No. 886,850, May 22, 1992, Pat. No. 5,284,350, and Ser. No. 789,173, Nov. 8, 1991, Pat. No. 5,267,745.

[51] Int. Cl.[5] .......... B62M 1/14

[52] U.S. Cl. .......... 280/250.1; 16/19

[58] Field of Search .......... 280/250.1, 304.1; 16/19; 297/DIG. 4

[56] References Cited

U.S. PATENT DOCUMENTS

| | | | |
|---|---|---|---|
| D. 321,335 | 11/1991 | Aoki et al. | 280/250.1 X |
| 3,189,385 | 6/1965 | Mommsen . | |
| 3,337,261 | 8/1967 | Nihlean et al. . | |
| 4,082,348 | 4/1978 | Haury . | |
| 4,101,143 | 7/1978 | Sieber . | |
| 4,166,631 | 9/1979 | Sanaski . | |
| 4,350,227 | 9/1982 | Knoche . | |
| 4,351,540 | 9/1982 | Minnebraker . | |
| 4,428,594 | 1/1984 | Minnebraker . | |
| 4,477,098 | 10/1984 | Minnebraker . | |
| 4,489,955 | 12/1984 | Hamilton . | |
| 4,500,102 | 2/1985 | Haury et al. | 280/304.1 |
| 4,572,576 | 2/1986 | Minnebraker . | |
| 4,592,570 | 6/1986 | Nassiri . | |
| 4,593,929 | 6/1986 | Williams . | |
| 4,595,212 | 6/1987 | Haury et al. . | |
| 4,648,619 | 3/1987 | Jungnell et al. . | |
| 4,676,519 | 6/1987 | Meier . | |
| 4,693,490 | 9/1987 | Loodberg et al. . | |
| 4,721,321 | 1/1988 | Haury et al. . | |
| 4,768,797 | 9/1988 | Friedrich . | |
| 4,770,432 | 9/1988 | Wagner . | |
| 4,840,390 | 6/1989 | Lockard et al. . | |
| 4,852,899 | 8/1989 | Kueschall . | |
| 4,887,826 | 12/1989 | Kantner . | |
| 4,892,323 | 1/1990 | Oxford | 280/250.1 |
| 4,917,395 | 4/1990 | Gabriele . | |
| 4,989,890 | 2/1991 | Lockard et al. | 280/250.1 X |
| 5,143,391 | 9/1992 | Robertson et al. | 280/304.1 X |
| 5,217,239 | 6/1993 | Koet | 280/250.1 |
| 5,267,745 | 12/1993 | Robertson et al. | 280/250.1 |

*Primary Examiner*—Brian L. Johnson
*Attorney, Agent, or Firm*—Burns, Doane, Swecker & Mathis

[57] ABSTRACT

A wheelchair frame assembly is provided with a foot rest mounting assembly and a caster mounting assembly that are mounted on side frame assemblies. The foot rest mounting assembly includes two foot plate mounting bars connected to respective side frame assemblies for mounting a foot plate. The foot plate mounting bars are positioned such that they angle inwardly towards one another to provide support for the lower portions of the legs and to allow easier movement into tight spaces. A foot plate is mounted to the end of each foot plate mounting bar in a manner that compensates for the obliquely downwardly extending and inwardly tapered nature of the foot plate mounting bar. The caster mounting assembly includes a fork that is provided with a plurality of holes for mounting casters of progressively greater diameter and for providing greater trail for progressively greater diameter casters. The wheelchair frame is also constructed to permit adjustment of the seat pan angle without changing the caster alignment and without altering the position of the drive wheel axles. The wheelchair can be constructed by attaching one of several different rear frame portions to a common side frame assembly in order to vary the cost and the performance characteristics of the wheelchair.

11 Claims, 8 Drawing Sheets

WHEELCHAIR FRAME ASSEMBLY AND COMPONENTS FOR USE THEREON

The present application is a continuation-in-part application of U.S. patent application Ser. No. 07/886,850 filed on May 22, 1992, now U.S. Pat. No. 5,284,350 and U.S. patent application Ser. No. 07/789,173 filed on Nov. 8, 1991, now U.S. Pat. No. 5,267,745 the disclosures of which are incorporated herein by reference.

FIELD OF THE INVENTION

The present invention relates generally to mobile vehicles for ill, handicapped, elderly or otherwise infirm individuals, and more particularly to wheelchairs, wheelchair frame assemblies and components for use therein.

BACKGROUND OF THE INVENTION

For many years, wheelchairs have provided an adequate vehicle for meeting the short-term transportation requirements of the ill, handicapped, elderly or otherwise infirm. While improvements have been made with respect to various aspects of the wheelchair, there still remain some areas that are susceptible of improvements.

By way of example, during the manufacture and assembly of wheelchairs, different diameter casters are often employed on different wheelchairs to effect a particular result. In some instances, it may be useful to mount larger diameter casters on the wheelchair while in other instances, the use of smaller diameter casters may prove to be more beneficial. Moreover, to increase the performance of the wheelchair by reducing the flutter of the caster, the caster is preferably mounted in such a way that the axle of the caster is set back rearwardly from the longitudinal axis of the mounting stem. Typically, the larger the diameter of the caster, the greater the amount of trail that is necessary to inhibit flutter. However, the amount of trail imparted to the caster must be weighed against the fact that the larger the setback of the caster, the more likely the caster will come into contact with the individual's foot during turning movement of the wheelchair. In typical wheelchair designs, changing the diameter and/or the trail of a caster requires removal and replacement of the entire caster mounting assembly.

Another area in which known wheelchairs are susceptible of improvements concerns the foot rest mounting assembly to which is attached to the foot plates for supporting an individual's feet. Usually, the foot plate is mounted on a frame member that extends downwardly and somewhat forwardly (i.e., not vertical). If the foot plate is attached to the end of the frame member such that the plane of the foot plate is perpendicular to the longitudinal axis of the frame member, the foot plate would be positioned at an undesirable angle, thereby providing discomfort to the individual. Thus, as seen in FIG. 9, some wheelchairs are designed such that the distal end 50 of the frame member 52 is bent downwardly slightly to result in a generally vertically oriented end. In that way, the foot plate 54 is oriented in a more horizontal manner so that the individual's foot assumes a more natural position when supported on the foot plate 54. Unfortunately, bending the distal end 50 of the 52 in the manner illustrated in FIG. 9 increases manufacturing costs and is somewhat more time consuming than would otherwise be the case if bending was not required.

An additional area of improvement for wheelchairs concerns the disposition of the foot plate frame member on the wheelchair frame assembly. Typically, because the hips of an individual are normally the widest part of the individual's body, the side frame assemblies defining the wheelchair frame must be spaced apart a sufficient distance to accommodate the individual's hips. However, the dimension across the portion of an individual's legs located below the hips typically decreases in the direction of the feet. With that in mind, other known wheelchairs attempt to provide some amount of lateral support for the legs by configuring the foot rest frame members 60 in the manner illustrated in FIG. 14. In particular, the foot rest frame members 60 are provided with an inwardly bent portion so that the lower portions of the frame members 60 are spaced apart by a distance less than the distance between the side flames 62. However, such a construction of the frame members 60 increases the manufacturing costs due to the fact that the frame member 60 must be bent during fabrication. Further, the frame members 60 illustrated in FIG. 14 do not take into account the fact that the width of an individual's body along the length of their legs gradually decreases from the hips to the feet. Thus, while the inwardly bent portions of the frame members 60 may provide some amount of lateral in the knee region of the legs, they provide little support for the portion of the legs located below the knee.

A still further area in which known wheelchairs are susceptible of improvements involves the way in which the adjustment of some characteristics of the wheelchair affects other characteristics of the wheelchair. For example, in some known wheelchairs, adjustment of the seat angle adversely impacts upon the caster alignment. Also, seat pan angle adjustment can cause the drive wheels to tow, thereby adversely impacting the wheelchair's performance. Further, attempts to increase or decrease the wheel base through forward or rearward movement of the drive wheels can affect the seat pan angle.

From a manufacturing and assembly standpoint, many known type of wheelchairs provide little flexibility in designing the wheelchair to meet the needs and the performance characteristics of various individuals. That is, manufacturing and assembling a general purpose wheelchair, for example, requires one complete set of component parts, while the fabrication of a more high performance wheelchair requires a completely different set of component parts. Thus, the manufacture and assembly costs associated with those known types of wheelchairs may be unnecessarily high.

OBJECTS AND SUMMARY OF THE INVENTION

To address the foregoing disadvantages and drawbacks, as well as others, it is one object of the present invention to provide a caster mounting assembly which is capable of receiving different diameter casters and providing varying amounts of trail for the different diameter casters.

It is also an object of the present invention to provide a foot plate mounting assembly that is relatively simple and inexpensive to manufacture and that provides greater comfort to the user.

It is another object of the present invention to provide a foot rest mounting assembly that provides greater lateral support for the individual's legs and that allows the forward end of the wheelchair to be maneuvered between relatively narrow spaces.

It is a further object of the present invention to provide a wheelchair frame that can be used to afford a wide range of performance characteristics.

Another object of the present invention is to provide a wheelchair frame that permits adjustment of the seat pan angle without affecting the caster alignment and the position of the drive wheel axles.

The foregoing objects as well as others are achieved in accordance with the present invention. According to one aspect of the present invention, the wheelchair frame is comprised of two side frame assemblies connected to one another and adapted to individually receive a drive wheel axle. A caster mounting assembly is mounted on each of the side frame assemblies for securing a caster to each side frame assembly. Each of the caster mounting assemblies includes a stem, and a fork extending from the stem. The fork of each caster mounting assembly is provided with an arrangement for mounting casters of progressively greater diameter and for providing grater trail for progressively greater diameter castes.

In a preferred embodiment, that function is achieved by providing the forks with a plurality of through holes for individually receiving the axle of a different diameter caster. The holes are successively positioned such that each successive hole is positioned at a successively greater distance from the free end of the fork and at a successively greater distance from the longitudinal axis of the stem.

In accordance with another aspect of the present invention, a easter mounting assembly for mounting a easter on the side frame assembly of a wheelchair includes a stem having a longitudinal axis, and a fork extending from the stem. The fork can be comprised of two spaced apart fork halves that are positioned substantially parallel to one another so that a caster can be positioned between the spaced apart fork halves. The fork is also provided with an arrangement for mounting casters of progressively greater diameter and for providing greater trail for progressively greater diameter casters.

In the preferred embodiment, the mounting of casters for progressively greater with diameter progressively greater trail is achieved through the inclusion of a plurality of holes in each of the fork halves for individually receiving an axle of a caster. The holes in the fork halves are aligned with one another to define pairs of holes, and the pairs of holes are successively positioned along the lower portion of the fork such that each successive pair of holes is positioned at successively greater distances from the free end of the respective fork halves, and at successively greater distances from the longitudinal axis of the stem.

In another aspect of the present invention, a wheelchair frame is comprised of two side frame assemblies that are connected to one another. Each of the side frame assemblies is provided with an arrangement for receiving a drive wheel axle and an arrangement for mounting a caster. A foot rest mounting assembly is also connected to at least one of the side frame assemblies. The foot rest mounting assembly includes a foot plate mounting bar and a foot plate disposed at a distal free end of the foot plate mounting bar. The foot plate mounting bar extends downwardly from the side frame assembly to which it is connected and the foot plate is connected to the distal end of the foot plate mounting bar by way of a washer. The washer is provided with a bore that receives the distal end of the foot plate mounting bar. In order to compensate for an angular inclination of the foot plate mounting bar, the bore in the washer is obliquely disposed relative to the longitudinal axis of the washer.

In the preferred embodiment, the washer is pivotally mounted on the foot plate to allow the foot plate to be pivoted from a first position for supporting an individual's foot to a second upwardly folded position that allows the individual to dismount from the wheelchair. The angle at which the bore in the washer is disposed relative to the longitudinal axis of the washer is selected such that the foot plate is generally horizontally oriented when in the first position. A similar foot rest mounting assembly can also be connected to the other side frame assembly.

In accordance with another useful aspect of the present invention, a wheelchair frame includes two side frame assemblies connected to one another, each of which is provided with an arrangement for receiving a drive wheel axle and an arrangement for mounting a caster. A foot rest mounting assembly is connected to one of the side frame assemblies and includes a foot plate mounting bar and a foot plate mounted at the distal free end of the foot plate mounting bar. The foot plate mounting bars comprise straight frame members that are tapered or inclined inwardly with respect to one another so that the distance between the two foot plate mounting bars gradually decreases towards the distal end of the foot plate mounting bars.

Another aspect of the present invention involves a wheelchair frame that comprises two side frame assemblies connected to one another, with each of the side frame assemblies being provided with an arrangement for mounting a drive wheel axle at a rear portion of the respective side frame assembly. A caster mounting assembly is pivotally mounted at a pivot point on a forward end of each side frame assembly for securing a caster to each side frame assembly. A seating arrangement is mounted between the side frame assemblies for allowing an individual to sit in the wheelchair. In addition, the wheelchair is constructed to permit adjustment of an angle of arrangement relative to a travelling surface without affecting the caster alignment and without altering the position of the drive wheel axles.

In the preferred embodiment, the wheelchair frame includes a rear frame portion removably connected to each of the side frame assemblies, and the arrangement for permitting adjustment of an angle of the seating assembly relative to a travelling surface while not altering the center of gravity of the wheelchair includes an axle plate mounted on each of the rear frame portions and two sets of holes disposed in each of the rear frame portions. Each set of holes in a respective rear frame portion is arranged on an arc whose radius originates at the pivot point, and the axle plate is adjustably mounted on the respective frame portion along the sets of holes to permit the angle of the seating arrangement to be adjusted while not altering the center of gravity. In addition, each axle plate includes a plurality of laterally extending holes that define the arrangement for mounting the drive wheels.

The present invention also provides a method of adapting a wheelchair frame to the needs or desires of an individual. The method involves providing a wheelchair frame front portion that includes two side frame assemblies connected to one another, attaching a caster mounting assembly to a forward end of the wheelchair frame front portion for permitting attachment of a caster, and attaching to a rear end of the wheelchair frame front portion either a first frame rear portion or a second frame rear portion. By selecting the first frame rear portion, it is possible to provide a general purpose wheelchair that allows for the use of different diameter drive wheels in conjunction with different diameter casters in order to vary the elevational height of the wheelchair frame and thereby achieve a hemi-height function. On the other hand, attaching the second frame rear portion to the rear end of the wheelchair frame portion provides a more versatile wheelchair that allows for height adjustment, center of gravity adjustment, and seat pan angle adjustment.

BRIEF DESCRIPTION OF THE DRAWINGS

Preferred embodiments of the present invention will be described with reference to the accompanying drawing figures, wherein like reference numerals refer to like elements and wherein.

DETAILED DESCRIPTION OF THE PREFERRED EMBODIMENTS

Figure 1:
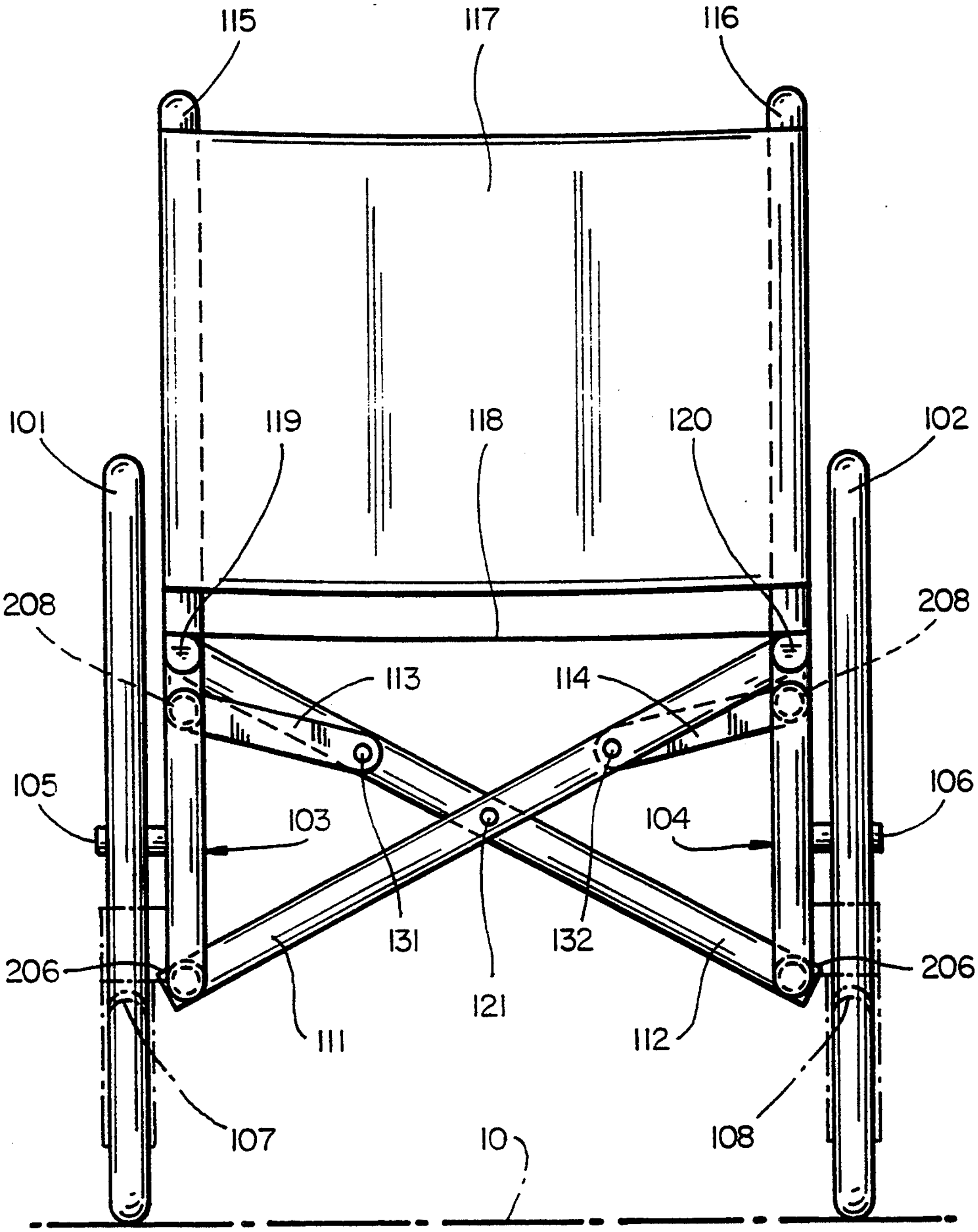
FIG. 1 is a front view of a foldable wheelchair.
Figure 2:
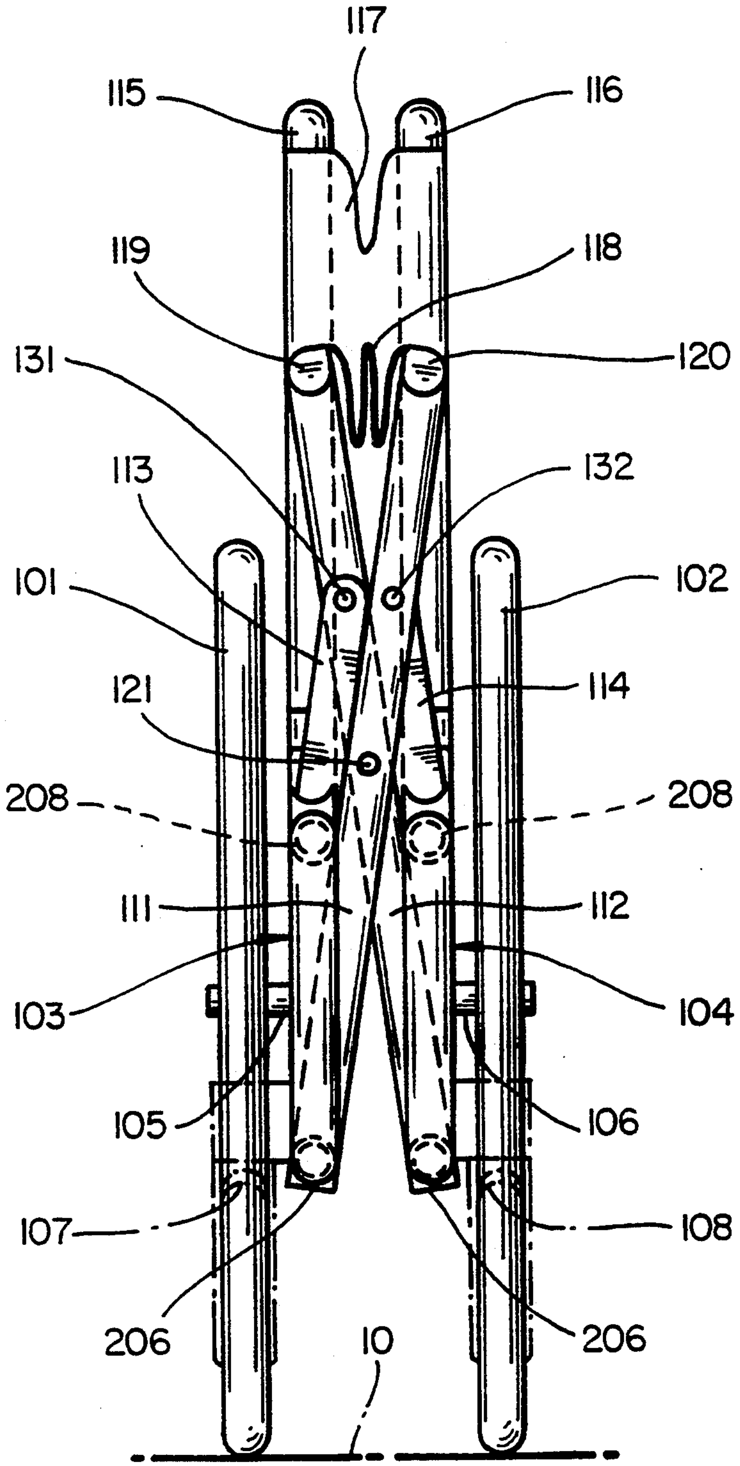
FIG. 2 is a front view of the foldable wheelchair illustrated in FIG. 1.

The present invention pertains to various aspects and component parts of a wheelchair such as the caster mounting assembly, the foot plate, the foot rest mounting assembly and the wheelchair frame. For purposes of illustration and facilitating an understanding of the present invention, those features and others will be described in connection with a foldable wheelchair. However, it is to be understood that the features of the present invention are equally applicable to and usable in conjunction with other non-foldable wheelchairs.

With reference initially to FIGS. 1–4, the foldable wheelchair includes two spaced apart end oppositely positioned side frame assemblies 103, 104 provide support for drive wheels 101, 102, castors 107, 108, a seat assembly 118, 119, 120 and a backrest assembly 115, 116, 117. The two side frame assemblies 103, 104 are connected to each other by a folding mechanism.

The folding mechanism (FIGS. 1–4) includes a pair of shafts 111, 112 that are pivotally connected to each other at a pivot point 121 that is centrally located on each shaft 111, 112. One of the shafts 111 is connected to a lower pivot attachment region of the side frame assembly 103 with a shaft sleeve 206 connected to one end of the shaft 111. The shaft 111 extends at an angle upwardly from that pivot attachment region, across the distance between the two side frame assemblies 103, 104 and is connected to an extruded tube 120 of the seat assembly. The other shaft 112 is connected to the side frame assembly 104 at a lower pivot attachment region with a shaft sleeve 206 connected to one end of the shaft 112. The other shaft 112 similarly extends at an angle upwardly from the lower pivot attachment region, across the distance between the two side frame assemblies 103, 104, and is connected to a seat extrusion tube 119.

Also included in the folding mechanism are a pair of pivot links 113, 114. The first pivot link 113 is connected at an upper portion of one of the shafts 112 at a pivot point 131 and is connected to an upper middle pivot attachment region of the side frame assembly 103 with a shaft sleeve 208 fixed to one end of the first pivot link 113. Similarly, the second pivot link 114 is connected to an upper portion of one of the shafts 111 at a pivot point 132 and extends to an upper middle pivot attachment region of the side frame assembly 104 with a shaft sleeve 208 fixed to one end of the second pivot link 114.

The side frame assembly 104 includes an upper middle pivot attachment region for receiving the shaft sleeve 208 of one of the pivot links 114 of the folding mechanism. The side frame assembly 104 also includes a lower middle pivot attachment region for receiving the shaft sleeve 206 of one of the shafts 112 of the folding mechanism. The shaft sleeves 206, 208 may freely rotate about the upper and lower middle pivot attachment regions, respectively, so that the wheelchair is easily adjusted into the foldable condition.

For folding the wheelchair, the two sides of the wheelchair are urged inwardly towards one another so that the shafts 111, 112 pivot around the pivot point 121, and the pivot lengths 113, 114 pivot around the pivot points 131, 132, respectively. Through the shaft sleeve 208, the pivot links 113, 114 also rotate into an upwardly extending position and thereby guide the movement of the shafts 111, 112 into the folded configuration (FIG. 3).

The seat assembly can include a pair of extruded tubes 119, 120 that rest on an upper region of the side frame assemblies 103, 104 when the wheelchair is unfolded. Spanning between the two extruded tubes 119, 120 is a nylon seat sling 118 (FIG. 1). The seat sling 118 is secured in each extruded tube 119, 120 by being wrapped around a dowel (not shown) that is insertable into a channel (not shown) along the length of each extruded tube 119, 120.

Each side frame assembly 103, 104 for a foldable wheelchair is substantially identical. Hence, the subsequent description will refer only to one side frame assembly 104. It should be appreciated, however, that identical features are present on the opposite side frame assembly 103. In fact, the side frames 103, 104 are completely interchangeable and may be used as either side of the foldable wheelchair.

Figure 3:
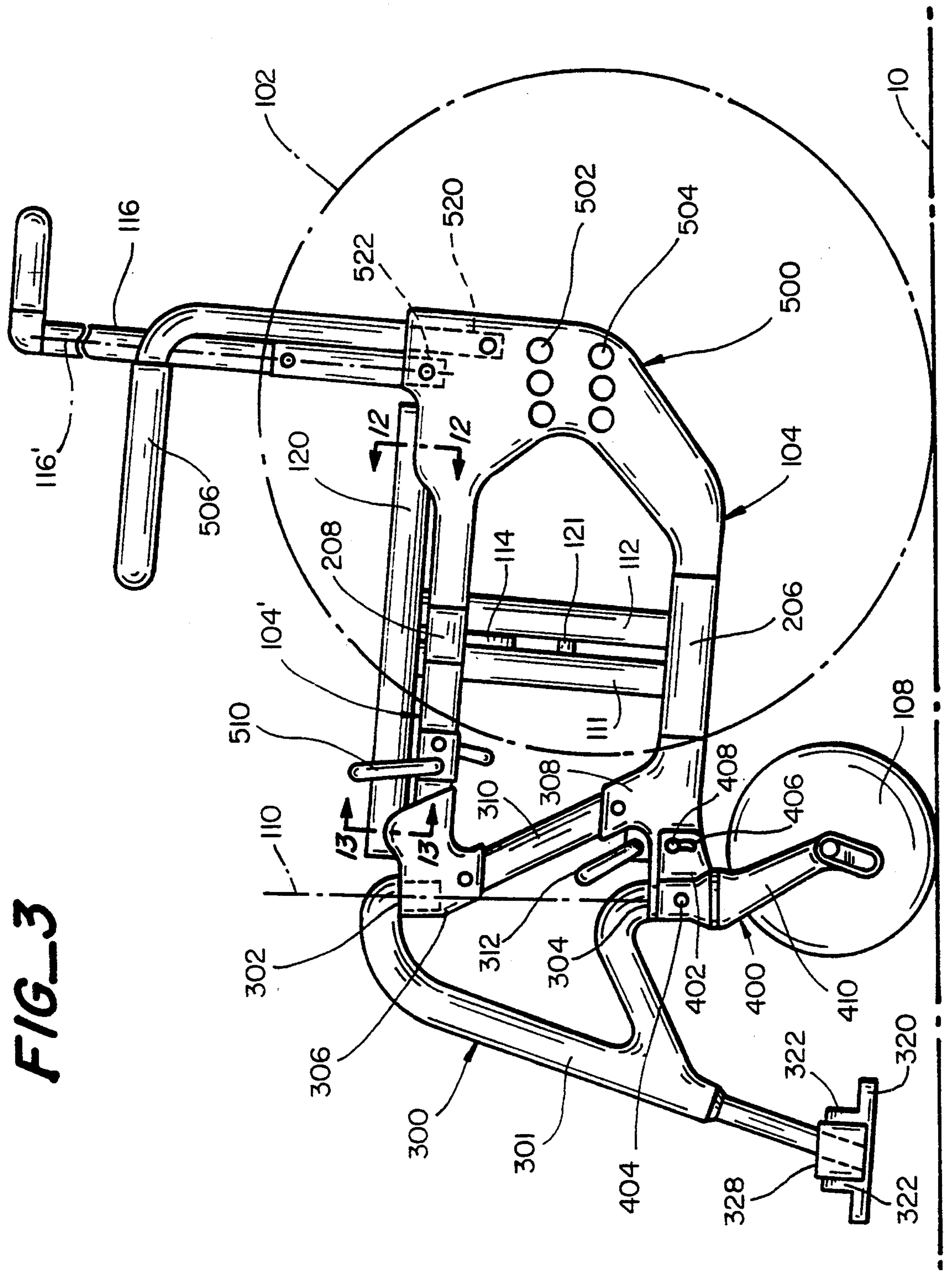
FIG. 3 is a side view of a wheelchair embodying the features of the present invention.
Figure 4:
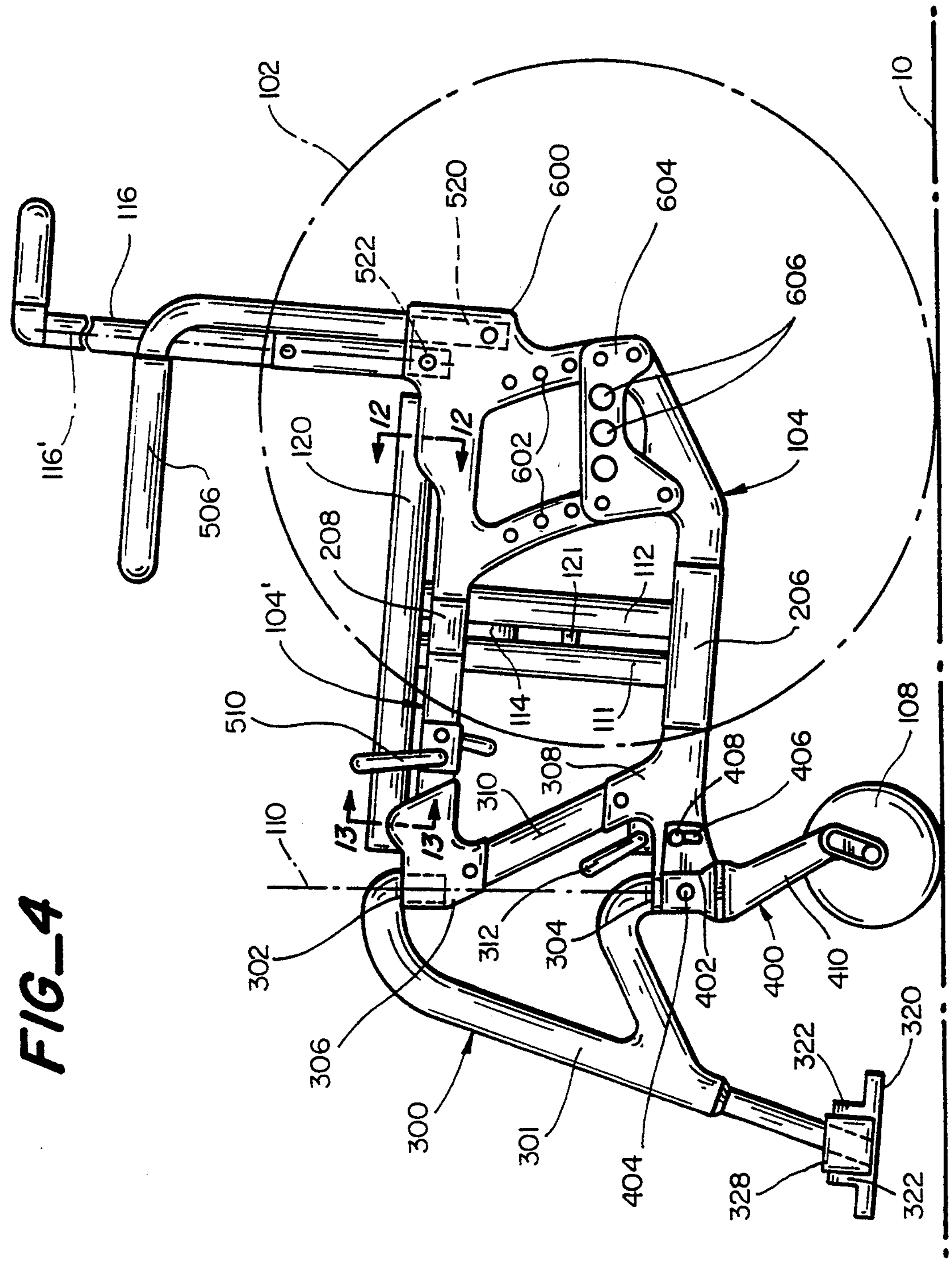
FIG. 4 is a side view of another wheelchair embodying the features of the present invention.

As seen in FIGS. 3 and 4, a forward region of the side frame assembly 104 serves to attach and support a foot rest mounting assembly 300. The foot rest mounting assembly 300 includes a foot plate 320 and a foot plate mounting bar 301 (sometimes referred to as a leg rest). An upper portion of the foot plate mounting bar 301 is provided with a downwardly extending mounting projection 302. Similarly, the lower region of the foot plate mounting bar 301 is provided with a second mounting projection 304. The first mounting projection 302 is received in a receptacle provided in a lug 306 that is disposed at the forward end of the side frame assembly 104. Likewise, the second mounting projection 304 is received in a receptacle disposed in a lug 308 that is disposed at the lower forward region of the side frame assembly 104.

Preferably, the lugs 306, 308 are removably mounted on the forward end of side frame assembly 104 in any suitable manner (e.g., bolts) to permit the lugs 306, 308 to be interchanged with other lugs for any desired purpose. Extending between the two lugs 306, 308 is a connector piece 310. The connector piece 310 can be separate from or formed in one piece with the lugs 306, 308 so that the lugs 306, 308 and the connector piece 310 constitute a single one piece member.

The foot rest mounting assembly 300 is preferably mounted with respect to the side frame assembly 104 in a manner that allows the foot rest mounting assembly 300 to be rotated or pivoted outwardly (i.e., counterclockwise as seen from above) about a rotational axis 110 (see FIGS. 3 and 4) to allow the user of the wheelchair to dismount or to allow the wheelchair to be pulled close to a counter or other similar structure. In other words, the mounting projections 302, 304 are suitably mounted in receptacles in the lugs 306, 308 for allowing the foot plate mounting bar 301 to rotate from a first position in which the foot plate 320 is positioned in front of the individual for supporting one foot of the individual to a second position in which the foot plate 320 is out of the way to allow the individual to dismount from the wheelchair. A known type of locking mechanism actuated by a lever 312 can be provided to lock the foot rest mounting assembly 300 in the first position in front of the wheelchair user.

As seen in FIGS. 3 and 4, the foot plate mounting bar 301 extends obliquely downwardly towards the travelling surface at an angle (i.e., not vertical) so that the longitudinal axis of the foot plate mounting bar 301 forms an acute angle with the travelling surface 10. The foot plate mounting bar is a straight member along its entire length (as seen from above). Although not illustrated, another foot rest mounting assembly extends from the other side frame assembly 103, and it should be understood that the features described below with respect to the foot plate mounting bar 301 and the attached foot plate 320 are likewise characteristic of the foot rest mounting assembly that extends from the other side frame assembly 103.

The foot plate mounting bar 301 is preferably mounted on the side frame assembly 104 in such a manner that the foot plate mounting bar 301 is inclined, tapered or angled inwardly toward the other foot plate mounting bar 301 so as to be disposed transverse to the plane of the side frame assembly 104. The foot plate mounting bar 301 is disposed such that a vertical plane containing the longitudinal axis 314 of the foot plate mounting bar 301 is disposed at an angle $\theta$ with respect to a vertical plane containing the longitudinal axis 316 of the side frame assembly 104 or the upper frame part 104' of the side frame assembly 104. As a result of the inwardly tapered or angled nature of the two foot plate mounting bars, the distance between the two foot plate mounting bars progressively decreases from the top ends of the foot plate mounting bars to the distal ends thereof. The angle $\theta$ can be any desired angle to serve the functions and purposes mentioned below. However, it has been found useful to design the mounting of the foot plate mounting bar 301 in such a way as to allow the foot plate mounting bar 301 to be rotated inwardly to such an extent that the distal ends of the two foot plate mounting bars 301 are spaced apart: 1) approximately ten (10) inches when the proximal ends are spaced apart approximately sixteen (16) inches; or 2) twelve (12) inches when the proximal ends are spaced apart eighteen (18) inches.

Figure 8:
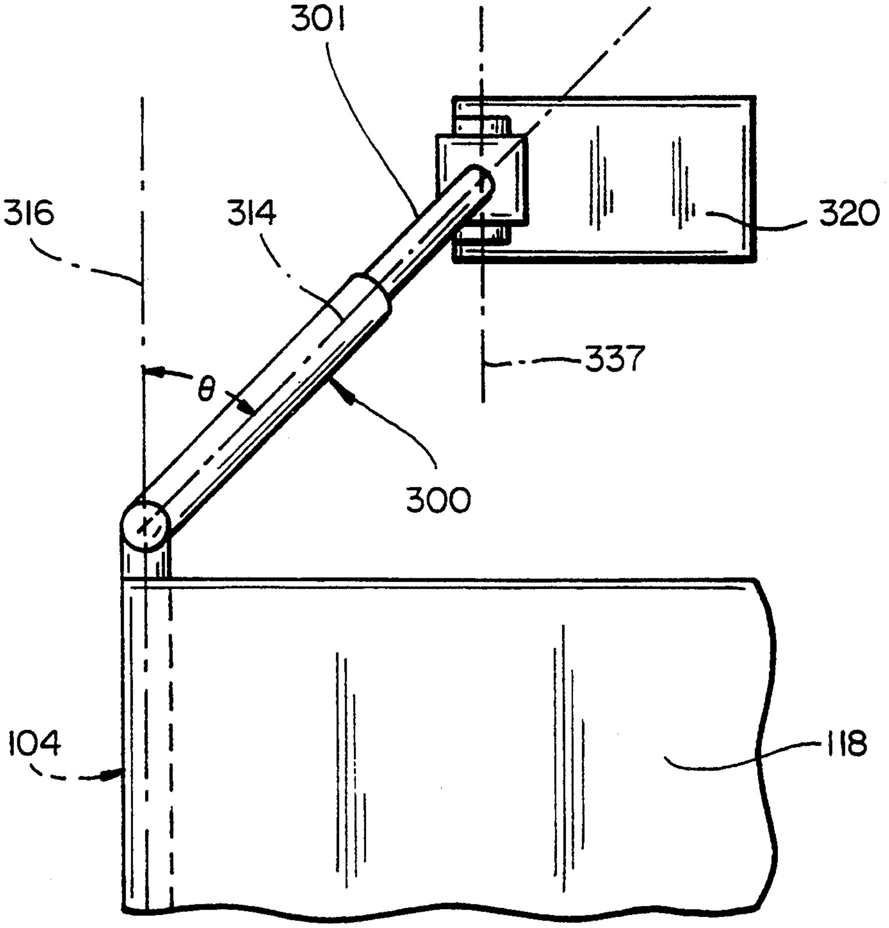
FIG. 8 is a top view of a portion of the wheelchair illustrating the inwardly tapered or inclined nature of the foot plate mounting bar in accordance with the present invention.
Figure 14:
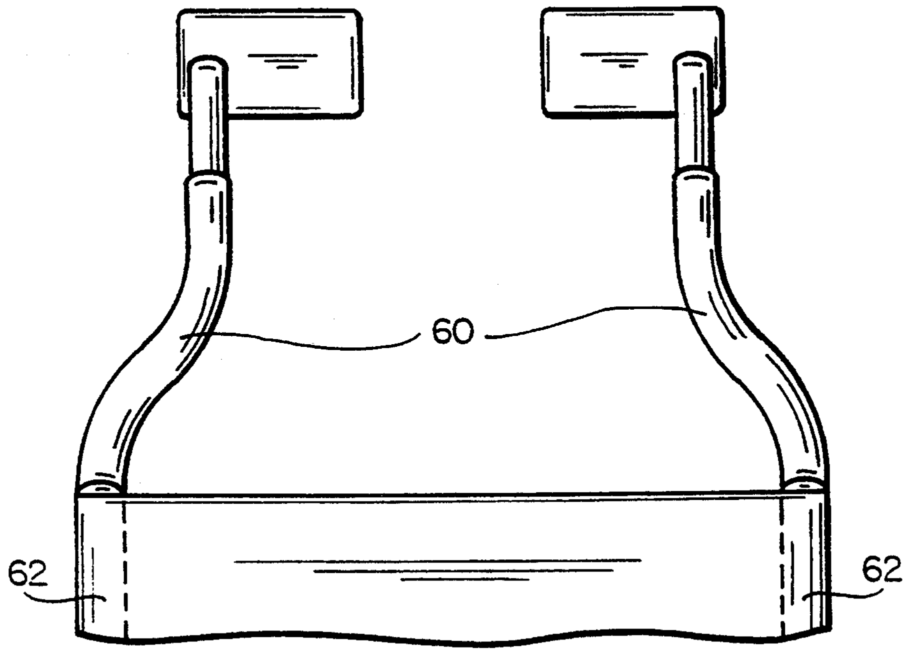
FIG 14 (PRIOR ART)
FIG. 14 is a top view of a portion of a prior art foot rest mounting assembly.

By inwardly tapering or angling the foot plate mounting bar 301 in the manner illustrated in FIG. 8, it is possible to maneuver the wheelchair into more narrow spaces such as between the legs of a table. In addition, the inwardly directed foot plate mounting bar 301 provides more support for the portions of the legs below the waist. Typically, the widest part of an individual's body is in the hips and thus, the side frame assemblies 103, 104 must be spaced a sufficient distance apart to comfortably accommodate the width of an individual's hips. If the foot plate mounting bar 301 extends straight forward as in some other known designs, little support is provided for the portion of the legs below the waist. Thus, by inwardly directing the foot plate mounting bar 301, it is possible to provide support for those portions of an individual's legs that would not normally be supported in other known wheelchairs. In addition, the lateral support of an individual's legs can be achieved without bending the foot plate mounting bar 301 as is the case with other known wheelchair designs such as illustrated in FIG. 14.

As noted above, the foot plate mounting bar 301 is rotatably or pivotally mounted so that it can be moved between first and second positions. The inward inclination of the foot plate mounting bar 301 can be achieved by incorporating a suitable stop mechanism (e.g., in the lugs 306, 308 that receive the mounting projections 302, 304) that allows the foot plate mounting bar 301 to rotate further inwardly (i.e., towards the other foot plate mounting bar 301), beyond the position in which the foot plate mounting bar 301 is parallel to the plane of the side frame assembly 103. In that way, when the foot plate mounting bar 301 is located in the first position for supporting an individual's foot on the foot plate 320, the foot plate mounting bar 301 will be inclined or angled inwardly towards the other foot plate mounting bar. The mounting structure for the foot plate mounting bar 301 can also be suitably designed to allow the foot plate mounting bar 301 to be locked in a straight position (i.e., parallel to the side frame assembly 104) to facilitate folding of the wheelchair.

Figure 5:
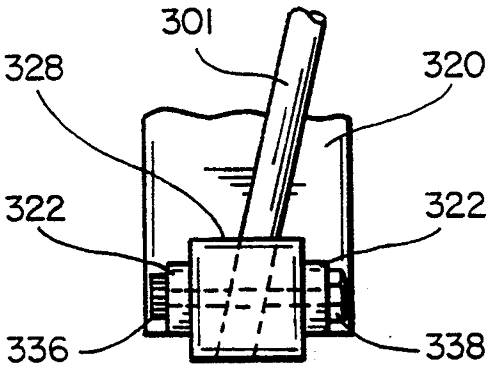
FIG. 5 is a side view of the foot plate mounted on the foot rest frame and folded upwardly.
Figure 6:
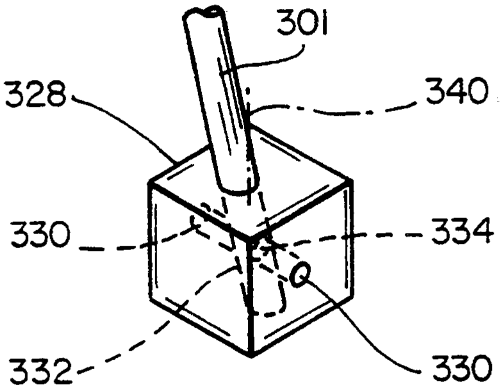
FIG. 6 is a top perspective view of the foot rest frame connected to the washer in accordance with the present invention.
Figure 7:
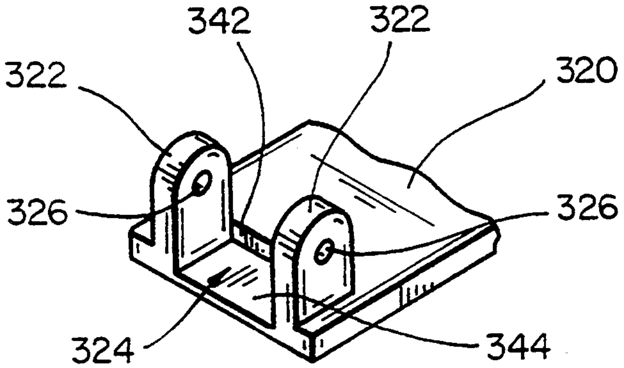
FIG. 7 is a top perspective view of the foot plate in accordance with the present invention.

With reference to FIGS. 5–7, attached to the distal end of the foot plate mounting bar 301 is a foot plate 320 for supporting an individual's foot. The foot plate 320 is provided with two upstanding flanges 322 between which is located a recess 324. Each of the upstanding flanges 322 is provided with a through hole 326 so that the through holes 326 are axially aligned with one another. A washer 328 is adapted to be positioned within the recess 324.

The washer 328 is provided with a through hole 330 that is adapted to be aligned with the holes 326 in the upstanding flanges 322. In addition, the washer 328 is provided with a bore 332 for receiving the distal end of the foot plate mounting bar 301. The distal end of the foot plate mounting bar 301 is provided with a through hole 334 that is adapted to be aligned with the through hole 330 in the washer 328. In that way, when the washer 328 is positioned within the recess 324 of the foot plate 320, a bolt 336 (FIG. 5) can pass freely through the hole 326 in one of the flanges 322, through the holes 330, 334 in the washer 328 and the foot plate mounting bar 301, and through the hole 326 in the other flange 322. A nut 338 or other suitable device can then be attached to the bolt 336 to prevent the bolt 336 from inadvertently falling out.

The foot plate 320 is free to rotate about the axis 337 (FIG. 8) of the bolt 336 so that the foot plate 320 can be rotated upwardly and out of the way when, for example, an individual wishes to dismount from the wheelchair.

As can be readily seen from FIGS. 5 and 6, the bore 332 in the washer 328 is disposed at an angle relative to the longitudinal axis 340 of the washer 328. The purpose for that angular inclination of the bore 332 is two-fold. First, the bore 332 compensates for the oblique downward angular inclination of the foot plate mounting bar 301 illustrated in FIGS. 3 and 4. If the foot plate 320 was simply attached to the end of the foot plate mounting bar 301 such that the plane of the foot plate 320 was perpendicular to the longitudinal axis of the foot plate mounting bar, an individual's foot would be forced to assume an uncomfortable position. That is, the individual's toes would be pushed towards oneself and the heel pushed away. The bore 332 in the washer compensates for that by disposing the foot plate 320 at a more horizontal orientation.

Figure 9:
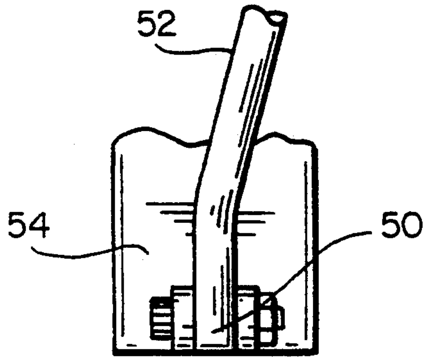
FIG 9 (PRIOR ART)
FIG. 9 is a side view of a prior art arrangement for connecting the foot rest frame to the foot plate.

Moreover, by mounting the distal end of the foot plate mounting bar 301 in the inclined bore 332 in the washer 328, it is not necessary to bend the distal end of the foot rest mounting assembly as is the case with other prior art foot rest structures such as discussed above and illustrated in FIG. 9. As a result, manufacturing costs and fabrication time can be reduced since a straight unbent foot plate mounting bar can be employed.

The second function provided by mounting the foot plate mounting bar 301 in the inclined bore 32 in the washer 328 is to compensate for the inwardly tapered or angled nature of the foot plate mounting bar 301 illustrated in FIG. 8. As can be readily understood, if the foot plate 320 was mounted at the distal end of the foot plate mounting bar 301 such that the plane of the foot plate 320 was positioned perpendicular to the longitudinal axis 314 of the foot plate mounting bar 301, the individual's foot would be forced to assume an uncomfortable position as a result of the inwardly directed nature of the foot plate mounting bar shown in FIG. 8. That is, when supported on the foot plate 320, the instep on each foot would be forced to rotate inwardly. By properly orienting the bore 332 in the washer 328, it is possible to inwardly direct the foot plate mounting bar while not adversely effecting the ability of an individual to comfortably rest their foot on the foot plate 320.

Preferably, the bore 332 in the washer 328 is inclined in such a manner that within a tolerance of approximately five degrees, the foot plate 320 is substantially horizontally oriented. With such a positioning of the foot plate, the individual's foot can assume a much more comfortable position when the individual is seated in the wheelchair.

It is also to be noted that the foot plate 320 is symmetrical about a vertical plane passing through the recess 324 midway between the upstanding flanges 322. Similarly, the washer 328 is symmetrical about a vertical plane containing the longitudinal axis of the through hole 330 extending through the washer 328. As a result, the foot plate 320 and the washer 328 can be used interchangeably on either the left side or the fight side of the wheelchair. As a result, manufacturing and assembly costs can be significantly reduced.

It is also to be noted that the side wall 342 and the bottom wall 344 of the recess 324 define a stop. Consequently, when the foot plate 320 is moved downwardly from the upwardly folded position, the bottom 344 and the side wall 342 of the foot plate 320 contact the washer 328 and prevent further rotational movement.

With reference once again to FIGS. 3 and 4, a caster mounting assembly 400 is disposed at the forward lower region of the side frame assembly 104. The caster mounting assembly 400 includes an upper frame portion 402 that is pivotally mounted to the lower lug 308 about a pivot point 404 to thereby allow pivoting movement of the entire caster mounting assembly 400 about the pivot point 404. The upper frame portion 402 includes a slot 406 that receives a pin 408 extending from the lower lug 308 for allowing a limited amount of pivoting movement of the caster mounting assembly 400.

The caster mounting assembly 400 also includes a fork 410 that is secured to the upper frame portion 402. As seen more clearly in FIGS. 10 and 11, attached to the upper end of the fork 410 is a threaded stem 412 that is adapted to be threadably received in the upper frame portion 402.

The fork 410 is comprised of two spaced apart fork halves 414 that are disposed generally parallel to one another on opposite sides of the longitudinal axis 416 of the stem 412. Each fork half 414 is comprised of an upper fork portion 418 that is connected to and extends downwardly from the stem 412, and a lower fork portion 420 that is connected to and extends downwardly from the upper fork portion 418. The upper fork portion 418 extends away from the longitudinal axis 416 of the stem 412 while the lower fork portion 420 extends back towards the longitudinal axis 416 of the stem 412. The lower fork portion 420 is provided with a recessed area 422 as well as a plurality of through holes 424 that are adapted to individually receive the axle of a caster.

Figure 10:
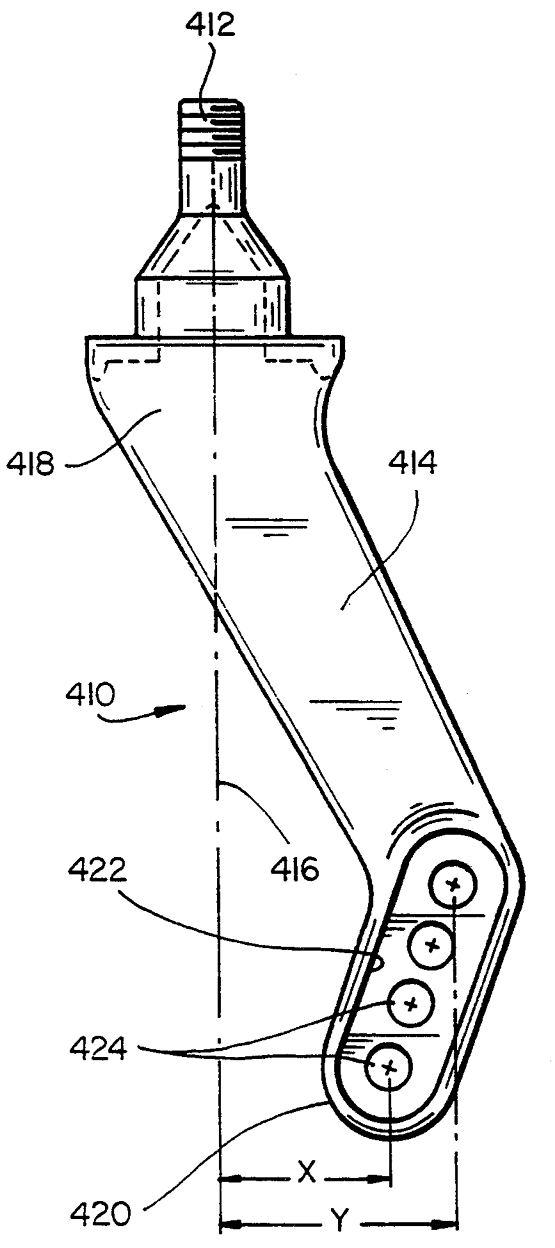
FIG. 10 is a side view of a portion of the caster mounting assembly in accordance with the present invention.

As can be readily seen from FIG. 10, the axis of the lowermost hole 424 is located closest to the longitudinal axis 416 of the stem 412 while the axis of the uppermost hole 424 is positioned farthest from the longitudinal axis 416 of the stem 412. Thus, the axis of each hole, beginning with the lowermost hole, is positioned at a successively greater distance from the longitudinal axis 416 of the stem 412.

Preferably, each of the holes 424 is adapted to receive the axle of a different diameter caster. Thus, the lowermost hole is provided for mounting a five inch diameter caster, the next hole is provided for mounting a six inch diameter caster, the third hole is provided for mounting a seven inch diameter caster and the last hole is provided for mounting an eight inch caster.

It can be seen, therefore, that the caster mounting assembly 400 is quite useful as it allows a single fork, and thus a single caster mounting assembly 400, to be employed for mounting casters of several different diameters. In addition, the holes 424 are disposed in such a manner that the greater diameter casters are provided with more trail (i.e., are rearwardly setback from the longitudinal axis 416 of the stem 412 by a greater amount). Thus, the caster mounting assembly 400 affords an arrangement for mounting casters of progressively greater diameter and for providing greater trail for progressively greater diameter casters. As a result, should it become necessary to provide a different diameter caster on the wheelchair, it is not necessary to replace the entire caster mounting assembly. Significant savings can be realized from a manufacturing standpoint since a single caster mounting assembly can be used with a wide variety of different diameter casters.

It has been found preferable to position the holes 424 in the lower fork portion 420 such that a five inch diameter caster mounted in the lowermost hole posses a trail X of approximately 1.5 inches while an eight inch diameter caster mounted in the uppermost hole 424 possesses a trail Y of approximately 2 inches.

Figure 11:
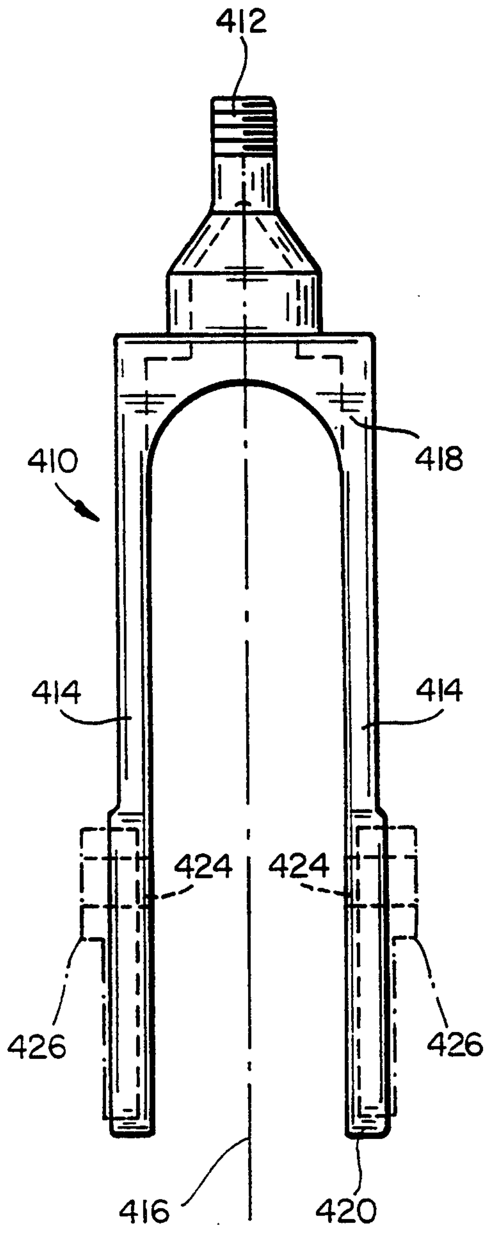
FIG. 11 is a front view of a portion of the caster mounting assembly in accordance with the present invention.

As best seen in FIG. 11, an injection molded oval washer 426 can be positioned in the recess 422 in each fork half 414 to facilitate mounting of the casters on the fork halves 414. In the position illustrated in FIG. 11, the oval 426 washer is aligned with the uppermost hole 424. Preferably, the oval washer 426 is designed so that it can be flipped over and aligned with the lowermost hole. Another injection molded oval washer could then be employed for the two intermediate holes. In that way, only two washers would be necessary to effect mounting of a caster in any one of the four holes.

Preferably, the two fork halves 414 and the stem 412 are formed in one piece. The two fork halves 414 and the stem 412 can be formed in one piece through molding, casting, forging or any other suitable method. Such an integral one piece unit provides several advantages.

First, in some other known wheelchair designs, the stem and the fork are separate and are appropriately secured to one another. Such a construction raises the possibility that the fork and stem can become disassembled or separated from one another, thereby creating an undesirable liability risk. In the case of the present invention, the stem will never come loose from the fork due to the fact that it is cast in one piece.

Additionally, by manufacturing the stem and fork as one piece, the manufacturing costs can be significantly reduced. Further in some instances such as when performance of the wheelchair is not critical, it may be possible to injection mold the stem and the fork together and thereby do away with the need for bearings.

With reference once again to FIG. 3, a rear frame portion 500 is attached to the rearward end of the side frame assembly 104. The rear frame portion 500 is provided with sockets for receiving the tabular parts of the side frame assembly 104 at upper and lower points thereof. The rear frame portion 500 is preferably removably secured to the side frame assembly 104 in any suitable manner.

The rear frame portion 500 is preferably provided with two rows of holes 502, 504. Each row of holes 502, 504 allows the axle 106 of the drive wheel 102 to be appropriately mounted on the side frame assembly 104. A similar rear frame portion is also provided on the other side frame assembly 103 for allowing the axle 105 of the other drive wheel 101 to be appropriately mounted.

The holes 502, 504 in the upper and lower rows are laterally displaced to allow for adjustments in the center of gravity of the wheelchair. The lower most row of holes 504 is typically used to mount the drive wheel 102. However, the uppermost row of holes 502 provides a hemi-height function so that capable individuals can propel themselves through the use of their legs. The uppermost row of holes 502 allows a smaller diameter drive wheel 102 to be employed so that, in conjunction with a smaller caster 108, the side frame assembly 104 can be positioned closer the travelling surface 10.

Figure 12:
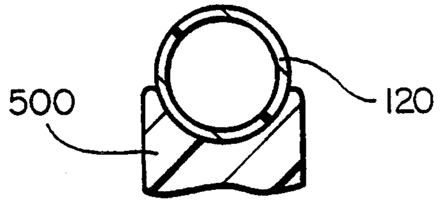
FIG. 12 is a cross-sectional view of the side frame assembly and seat assembly taken along the section line 12—12 in FIGS. 3 and 4.

The rear frame portion 500 can also be provided with appropriate molded in sockets 520, 522 for receiving an arm rest 506 and a back rest 116. Suitable structure can also be included to secure the arm rest 506 and the back rest 116 in place, and to allow the arm rest to pivot outwardly to facilitate dismounting from the wheelchair. As best seen in FIG. 12, the upper region of the rear frame portion 500 can be configured to form a cradle for receiving the extruded tube 120 of the seat assembly. In that way, the extruded tube 120 will be stably supported on the side frame assembly 104.

Figure 13:
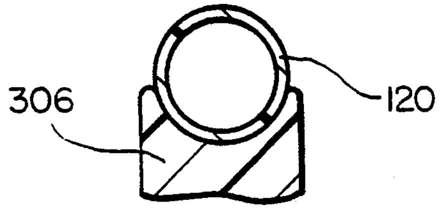
FIG. 13 is a cross-sectional view of the side frame assembly and seat assembly taken along the section line 13'13 in FIGS. 3 and 4.

In a similar manner, the upper region of the upper lug 306 can be configured to form a cradle to support the opposite end of the extruded tube 120 as illustrated in FIG. 13. A suitable breaking/locking device actuated by a handle 510 can be mounted on the side frame assembly 104 to effect breaking/locking of the drive wheel 102. In addition, an anti-tip device can be secured to the rear frame portion 500 to prevent backward tipping of the wheelchair.

As an alternative to the rear frame portion 500 illustrated in FIG. 3, a different rear frame portion could be employed. Such an alternative rear frame portion 600 is illustrated in FIG. 4. The rear frame portion 600 is provided with sockets at its upper and lower regions for receiving the horizontal frame tubes of the side frame assembly 104. Like the rear frame portion 500, the alternative rear frame portion 600 is preferably removably mounted on the side frame assembly 104 in any suitable manner.

The second rear frame portion 600 illustrated in FIG. 4 differs from the first rear frame portion shown in FIG. 3 in several respects. The second rear frame portion 600 is provided with a series of bolt points 602 for mounting an axle plate 604 at any desired position through appropriate alignment of holes in the axle plate 604 with the bolt points 602. The axle plate 604 is provided with a plurality of axle mounting holes 606 for allowing the drive wheel 102 to be mounted in place. The axle mounting holes 606 are mounted at various lateral locations thereby allowing the drive wheel 102 to be mounted in any number of positions in order to obtain a desired center of gravity.

Each generally vertically extending set of bolt points 602 is disposed along an arc whose radius originate from the pivot point 404 on the caster mounting assembly 400. Consequently, the seat pan angle can be adjusted according to placement of the axle plate 604 in the appropriate bolt points 602.

The disposition of the bolt points 602 along an arc whose radius originates from the pivot point 404 on the caster mounting assembly 400 is quite advantageous as it helps to ensure that adjustment of the seat pan angle can be effected without altering any other characteristic of the wheelchair. In essence, the caster mounting assembly 400 and the axle plate 604 are fixed in space, and the entire remainder of the wheelchair is free to pivot about the pivot point 404 on the caster mounting assembly 400. Thus, disposition of the bolt points 602 allows the remainder of the wheelchair frame to pivot in a way that permits adjustment of the seat pan angle without changing any other aspect or characteristic of the wheelchair such as the position of the drive wheel axle 106, the position of the drive wheel 102, the position of the caster 108 or the vertical orientation of the longitudinal axis of the caster stem.

In contrast, if the bolt points were disposed in a vertical arrangement, rather than an arcuate arrangement centered around a common pivot point, attempts to adjust the seat pan angle by moving the axle plate would cause the axle plate to rotate. For example, in the position shown in FIGS. 3 and 4, if the rear end of the seat is dropped down, an axle plate mounted on a vertical arrangement of holes would be caused to rotate in the clockwise direction. That rotation of the axle plate would cause the drive wheel axle to also move. At that point, if the wheel axle were shifted rearwardly to increase the wheel base, the seat pan angle would also be altered. In addition, the caster alignment of a rigidly mounted caster would be adversely affected. That is, the caster would be forced to move forwardly slightly, (i.e., the longitudinal axis of the caster stem would be rotated clockwise) thereby producing directional instability. As a result, the wheelchair would no longer track in a straight manner. Also, if the wheels are provided with camber, rotation of the axle plate would cause undesirable tow out, which in turn would cause undesirable scrubbing of the wheels and reduced performance.

On the other hand if the seat were moved upwardly from the position shown in FIGS. 3 and 4 (assuming the existence of bolt points to allow such an adjustment), the axle plate would rotate counterclockwise. That would result in movement of the drive wheel ale as well as rearward movement of the caster (i.e., counterclockwise rotation of the longitudinal axis of the caster stem). Such movement of the caster would significantly impair the steerability of the wheelchair.

It is evident, therefore, that the seat pan angle adjustment feature of the present invention offers significant improvements and advantages. In the present invention, it is possible to adjust the seat pan angle without altering the caster alignment (i.e., the vertical orientation of the longitudinal axis of the caster stem, and the position of the caster and caster axle) and without changing or affecting the position of the drive wheel axle (and thus the drive wheel). Moreover, the drive wheel ales can be shifted back and forth to change the length of the wheel base, without affecting the seat pan angle or any other characteristic of the wheelchair.

Like the first rear frame portion 500, the second rear frame portion 600 can be provided with appropriate molded in sockets 520, 522 or other mounting structure for receiving an arm rest 506 and/or a back rest 116. Suitable securing means can be provided to secure the back rest 116 and the arm rest 506 in place, and to allow the arm rest to be pivoted out of the way to facilitate dismounting from the wheelchair. Also, the upper region of the rear frame portion 600 and the upper lug 306 can be appropriately contoured as illustrated in FIGS. 12 and 13 to receive the extruded tube 120 of the seat assembly. Additionally, an anti-tip device could be secured to the rear frame portion 600 to prevent backward tipping of the wheelchair.

The rear frame portions 500, 600 can be cast, molded, forged or otherwise formed in any desirable manner.

The two rear frame portions 500, 600 illustrated in FIGS. 3 and 4 afford much greater freedom in manufacturing and assembling the wheelchair. That is, two significantly different styles of wheelchairs can be manufactured and assembled with almost the same components. For instance, a relatively less expensive wheelchair can be manufactured and assembled through utilization of the rear frame portion 500 illustrated in FIG. 3. While the resulting wheelchair is not adjustable to the same extent as the wheelchair illustrated in FIG. 4, it does nevertheless provide a general purpose wheelchair with some adjustability in the center of gravity. Additionally, the wheelchair provides a hemi-height feature which permits the use of a smaller diameter drive wheel and a smaller diameter caster wheel to allow individuals to move the wheelchair through the use of their legs and feet.

On the other hand, the exact same side frame assemblies employed in the wheelchair illustrated in FIG. 3 can also be used to manufacture and assemble the wheelchair illustrated in FIG. 4. The only difference is that the second rear frame portion is attached to the side frame assembly 104 rather than the first rear frame 500. The second rear frame 600 would most likely be used in conjunction with a more expensive wheelchair in which performance characteristics are important. In that respect, the second rear frame portion 600 allows greater flexibility in altering aspects of the wheelchair that increase its performance.

It is also to be understood that various parts of the side frame assemblies 103, 104 could be fabricated of different materials in order to, for example, reduce the weight and increase the performance of the wheelchair. For example, in its most inexpensive form, the wheelchair could be made almost entirely of aluminum. Alternatively, the wheelchair could be fabricated from a combination of aluminum and carbon parts, a combination of titanium and carbon part, or all titanium parts.

As a result of the construction of the wheelchair of the present invention, it is possible to position the folding shafts 111, 112 at or substantially at (i.e., within approximately one inch) the center of gravity of the wheelchair and the individual. In particular, the shafts 111, 112 can be positioned approximately seven inches from the center line 116′ of the backrest 116, the approximate point at which the weight of an individual on the wheelchair is centered. By locating the shafts 111, 112 in that manner, a much stronger wheelchair frame structure is provided since the individual's weight is centered at the shafts 111, 112. The disposition of the shafts also helps reduce possible tow out when the individual is seated in the wheelchair, thus allowing smoother rolling movement of the wheels. In other known folding wheelchairs, frame members corresponding to the shafts 111, 112 are located more forwardly (i.e., towards the casters) and thus, the point at which the individual's weight is centered is not supported directly underneath by the frame members. As a result, undesirable tow of the drive wheels can occur.

As noted previously, the features of the present invention described above such as the caster mounting assembly 400, the foot rest mounting assembly 300, the foot plate 320 and the interchangeable rear frame portions 500, 600 have been described as being used in conjunction with a foldable wheelchair, but those elements as well as others described above are also usable in connection with any type of wheelchair.

The principals, preferred embodiments and modes of operation of the present invention have been described in the foregoing specification, however, the invention which is intended to be protected is not to be construed as limited to the particular embodiments disclosed. Further, the embodiments described herein are to be regarded as illustrative rather than restrictive. Variations and changes may be made by others without departing from the spirit of the present invention and it is expressly intended that all such variations and changes which fall within the spirit and scope of the present invention as defined in the claims, may be embraced thereby.

What is claimed is:

1. A wheelchair frame comprising:

two side frame assemblies connected to one another, each side frame assembly including a drive wheel axle receiving means for receiving a drive wheel axle; and a caster mounting assembly mounted on each side frame assembly for securing a caster to each of the side frame assemblies, each of said caster mounting assemblies including a stem and a fork extending from the stem, said stem having a longitudinal axis, the fork of each caster mounting assembly including a plurality of holes for receiving a caster axle, said plurality of holes being arranged to position a caster axle at progressively greater distances from a free end of the fork while simultaneously positioning the caster axle at progressively greater distances from the longitudinal axis of the stem.

2. The wheelchair frame according to claim 1, wherein said holes being positioned such that a hole located closest to the free end of the fork is located closest to the longitudinal axis of the stem.

3. The wheelchair frame according to claim 1, wherein said fork includes two substantially parallel fork halves that are spaced apart to receive a caster therebetween, said stem and said fork halves being cast in one piece.

4. The wheelchair frame according to claim 1, wherein said fork includes upper and lower fork portions, said upper fork portion extending from the stem away from the longitudinal axis of the stem and said lower fork portion extending from the upper fork portion and toward the longitudinal axis of the stem.

5. A caster mounting assembly for mounting a caster on a side frame assembly of a wheelchair frame comprising: a stem for being connected to a side frame assembly, aid stem having a longitudinal axis; and a caster mounting member extending from said stem for mounting a caster, said caster mounting member having a free end, said caster mounting member including a plurality of holes for receiving a caster axle, one of said holes which is closest to said free end being located closer to said longitudinal axis of the stem than one of said holes which is located farther from said free end for mounting casters of progressively greater diameter and for providing greater trail for progressively greater diameter casters.

6. The caster mounting assembly according to claim 5, wherein said caster mounting member includes a fork comprised of two spaced apart fork halves, and including a plurality of holes in each of the fork halves for receiving caster axles, the holes in the fork halves being aligned with one another to define pairs of holes, each of said fork halves having a distally located free end and the pairs of holes being successively positioned such that each successive pair of holes is positioned at successively greater distances from the free ends of the respective fork halves and at successively greater distances from the longitudinal axis of the stem.

7. The caster mounting assembly according to claim 6, wherein each fork half is comprised of an upper fork portion and a lower fork portion, said upper fork portion of each fork half extending from the stem and away from the longitudinal axis of the stem, said lower fork portion of each fork half extending from the upper fork portion of the respective fork half and toward the longitudinal axis of the stem.

8. The caster mounting assembly according to claim 7, wherein the stem and the two fork halves are cast in one piece.

9. A wheelchair frame, comprising:

two side frame assemblies connected to one another, each side frame assembly including a drive wheel axle mounting means for mounting a drive wheel axle; and a caster mounting assembly mounted on each side frame assembly for securing a caster to each side frame assembly, each caster mounting assembly including a stem having a longitudinal axis and a fork extending from the stem, the fork of each caster mounting assembly including at least a first pair of holes and a second pair of holes for receiving a caster wheel axle, said first pair of holes being located closer to a free end of the fork than the second pair of holes, the second pair of holes being located farther from the longitudinal axis of the stem than the first pair of holes.

10. A wheelchair according to claim 9, wherein the fork includes an upper fork portion extending away from the stem and a lower fork portion extending away from the upper fork portion, the upper fork portion extending away from the longitudinal axis of the stem as the upper fork portion approaches the lower fork portion, the lower fork portion extending towards the longitudinal axis of the stem as the lower fork portion approaches the free end of the fork.

11. A wheelchair according to claim 9, including at least three pairs of holes in the fork for receiving a caster wheel axle.

* * * * *